United States Patent Office 3,004,752
Patented Oct. 17, 1961

3,004,752
INTEGRATED AUTOMOTIVE HEATING AND
AIR CONDITIONING SYSTEMS
Fred D. Armes and Philip S. Rogers, Lockport, N.Y.,
assignors to General Motors Corporation, Detroit,
Mich., a corporation of Delaware
Filed Jan. 12, 1959, Ser. No. 786,336
1 Claim. (Cl. 257—289)

This invention relates to heating and air conditioning systems and more particularly to integrated heating and air conditioning systems for automotive vehicle passenger compartments.

Prior to the present invention, the heating and air conditioning of an automobile have been considered as separate functions and systems for carrying out the separate functions have been controlled separately although in some cases certain structural elements have been involved in performing both functions—such as evaporators have been connected with heater cores with the same air conduits as taught, for example, in the United States Patent 2,264,848 granted December 2, 1941, to J. D. Kahl. In this patent an evaporator core and a heater core are arranged in parallel in the air ducting. Another system, but in which these heat exchangers are arranged in series with respect to each other, is disclcosed in the United States application for Letters Patent Serial No. 478,958 filed December 31, 1954, now Patent No. 2,873,953 in the name of M. A. Thorne. In each of these systems outside air is admitted from a forward zone on the vehicle and passed through a duct system for heating or cooling prior to directing it into the passenger compartment. Because of the lack of available space, the problem has heretofore been to provide compactness of the ducting and heat exchangers. Another problem has been the provision of proper air circulation in the heating and air conditioning system as well as adequate distribution of the treated air to the vehicle passengers. With these problems solved to a more or less extent in systems such as mentioned above, a problem of considerable magnitude remained. That problem pertained to the control of the numerous valves and switches, the operation of which must be consistent with varying ambient conditions and differing personal whims.

The solution would be to provide an integrated heating and air conditioning system with a single control for adjustment to suit personal whims and capable automatically to attain and maintain a desired passenger compartment temperature condition independent of outside ambient conditions. This necessarily involves heating or cooling in varying degrees, changing of the amounts of air introduced, selection of outside or recirculated air or both in proper proportions, ventilation without heating or cooling, and effective defrosting and, if necessary as under extreme conditions, de-icing of the windshield. The speed of the vehicle, the ambient temperature and the engine coolant temperature are variable factors which must be contended with if the integrated system is to meet the prime objectives of comfort and safety for the automobile passengers. If the latter, and including particularly the driver, are automatically made comfortable, safety is enhanced as diversions of attention, heretofore necessarily required for manual adjustment, are not required.

An object of the present invention is to provide an improved and integrated automotive heating and air conditioning system with an optimum of automatic control.

To this end, a feature of the present invention is a heating and air conditioning system using temperature sensing devices associated with automatic and electrically energized controls of the valves and other operative elements. Another feature is a heating and air conditioning system having a single manual adjustment to suit personal requirements for comfort or to satisfy particular whims in combination with controls which normally function automatically to attain and maintain pre-set conditions despite variations in ambient conditions.

The above and other important features of the invention will now be described in detail in the specification and then pointed out more particularly in the appended claim.

It will be understood that the present invention pertains to the over-all control of an integrated heating and air conditioning system. There are aspects, however, which necessitate narrow fields of control and which, while utilized in practicing the present invention, may be varied. One of these aspects is the prevention of freeze-up of an evaporator and overloading of a compressor, these being components of the air conditioning portion of the over-all system. This aspect may be satisfactorily provided for to insure proper operation by using a hot gas by-pass valve adjustable by use of a Bowden wire as disclosed in the United States application for Letters Patent Serial No. 570,201, filed March 7, 1956, now Patent No. 2,942,433, in the names of Messrs. Holmes, Mandy and Taylor and entitled "Air Conditioning Systems." Another aspect pertains to the heating functions and is the specific value structure for controlling the quantity of engine coolant flowing through the core of a heat exchanger to impart the desired temperature to air passing through that core on its way to the passenger compartment. A suitable valve structure for this aspect and which may also be adjusted by manipulation of a Bowden wire is disclosed in the United States Patent No. 2,778,576 granted January 22, 1957, to R. M. Johnston and entitled "Temperature Responsive Actuating Devices."

Figure 1:
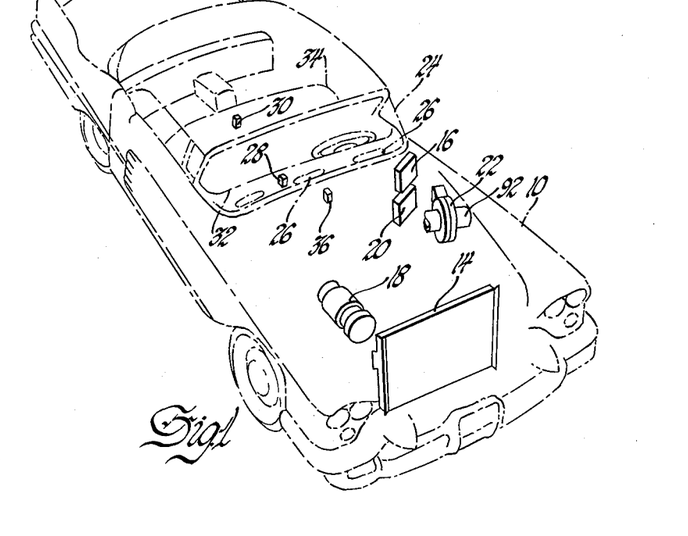
FIG. 1 is a phantom perspective view of an automobile in which several main operative components of a heating and air conditioning system are shown diagrammatically as installed, the ducting, switches, valves and wiring being omitted.
Figure 2:
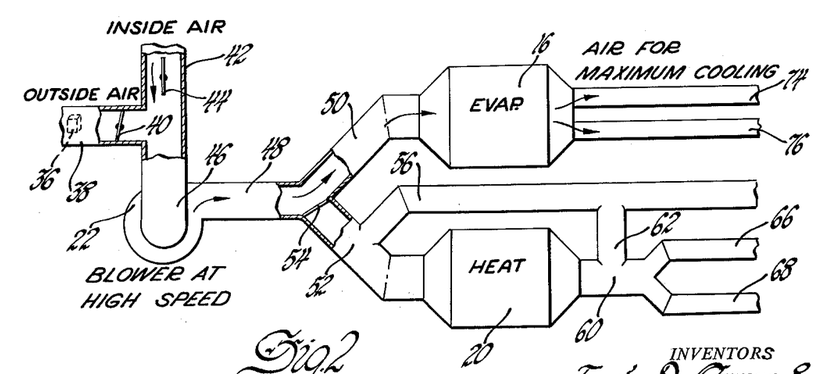
FIG. 2 is a diagrammatic view of the air flow duct system for directing air into the passenger compartment of the vehicle shown in FIG. 1 with the air valves of the system positioned to insure maximum cooling of the compartment, the inlet and outlet extremities of the ducting being omitted.
Figure 3:
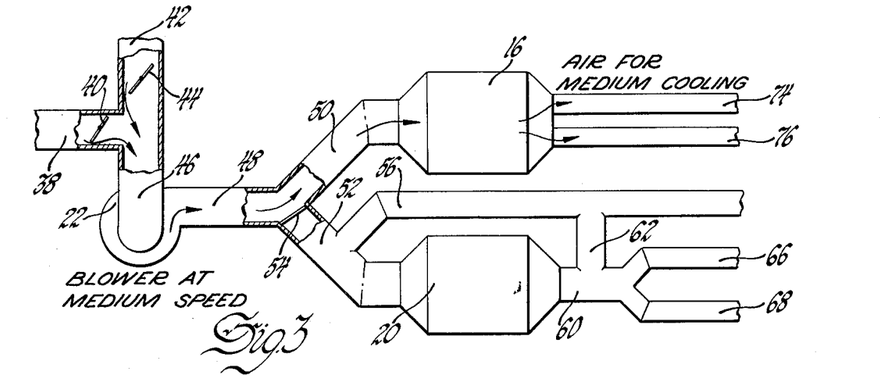
FIG. 3 is a view similar to that of FIG. 2 but with the air valves adjusted for medium cooling.
Figure 4:
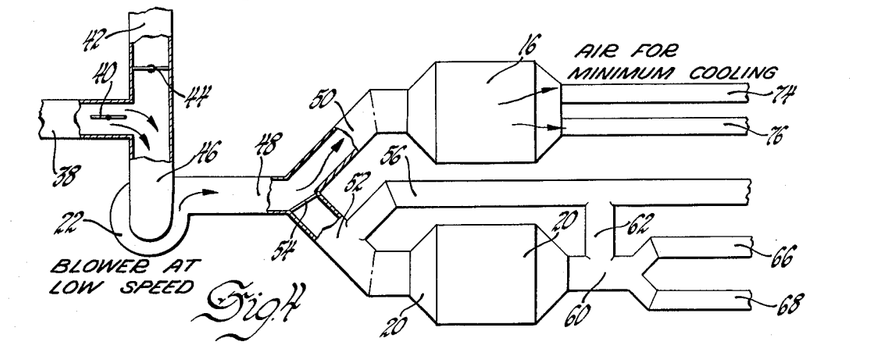
FIG. 4 is a diagrammatic view with the air valves set for minimum cooling.
Figure 5:
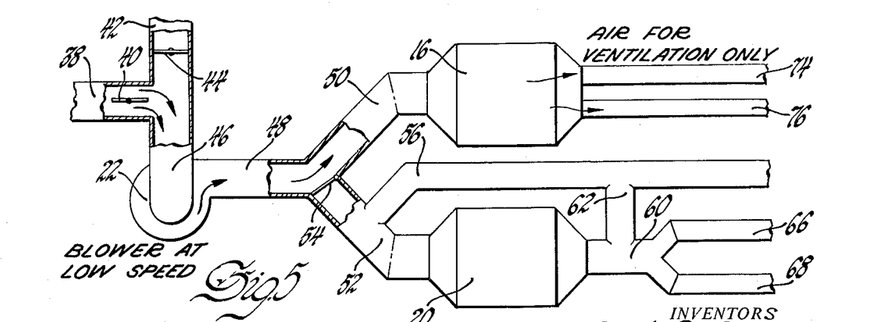
FIG. 5 shows the valves positioned for full outside air admission to bring about ventilation with no heating or cooling and the air passing through an evaporator core.
Figure 6:
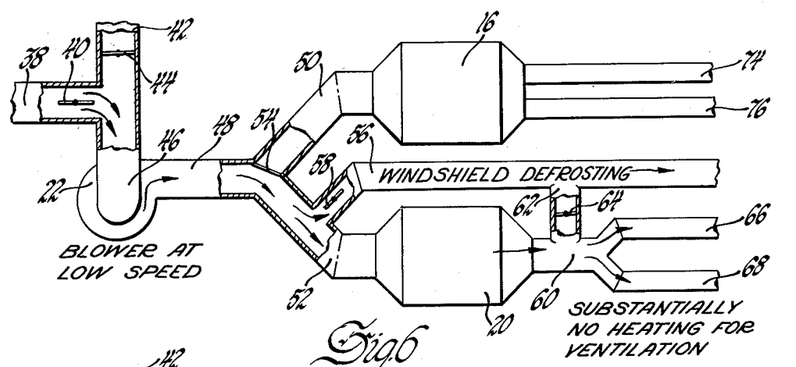
FIG. 6 shows the valves positioned for admitting only outside air to the system with some of that air being directed for defrosting the windshield and the remainder being directed through the heater for ventilation with no or a slight amount of heat added.
Figure 7:
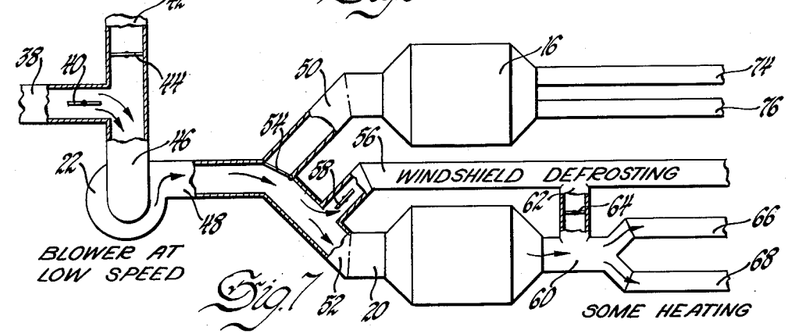
FIG. 7 shows the valves positioned as in FIG. 6 for windshield defrosting but heat being provided to some or a substantial extent.
Figure 8:
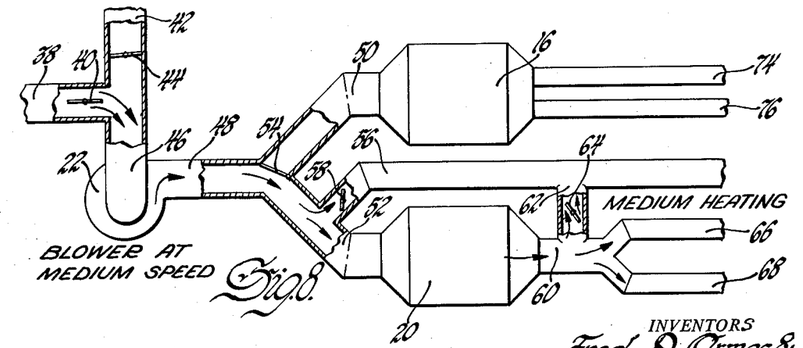
FIG. 8 illustrates the valve setting for medium heat for both windshield defrosting and heating of the passenger compartment.
Figure 9:
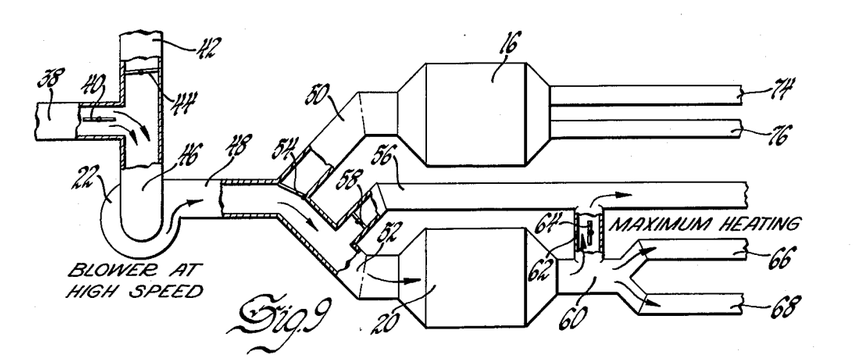
FIG. 9 shows the situation for maximum heating with high blower speed and defrosting of the windshield.

The automobile 10 depicted in FIG. 1 is provided with an air conditioning system condenser 14, an evaporator 16 and a refrigerant compressor 18 mounted within the confines of the front portion of the vehicle. A heater core 20 and also a multi-speed blower 22 are shown. Conduits and other components connecting the various instrumentalities in operative relation are not shown in FIG. 1 as they are subject to variation and are well known in their functions. It suffices herein state, however, that the blower 22 is adapted to drive outside air or recirculated air through either the evaporator core 16 or the heater core 20 and into the passenger compartment or to the inside surface of the windshield 24 by way of the nozzles 26 for defrosting purposes.

Two temperature sensing devices 28 and 30 are employed in the passenger compartment. The device 28 is mounted above the instrument panel 32 and the device 30 is mounted on the back of the front seat 34. These locations have been preferred, but others may be used. A third sensing device 36 is in an outside air inlet located immediately forward of the windshield base and extending into the vehicle cowl. Each sensing device is in the form of a thermistor which comprises a temperature sensitive material that varies in electrical resistance inversely with temperature change. Such a device is disclosed in the United states Patent 2,480,166 granted August 30, 1949, in the names of Schwartzwalder, Rulka and Smith, and entitled "Resistor for Thermogauges."

Figure 12:
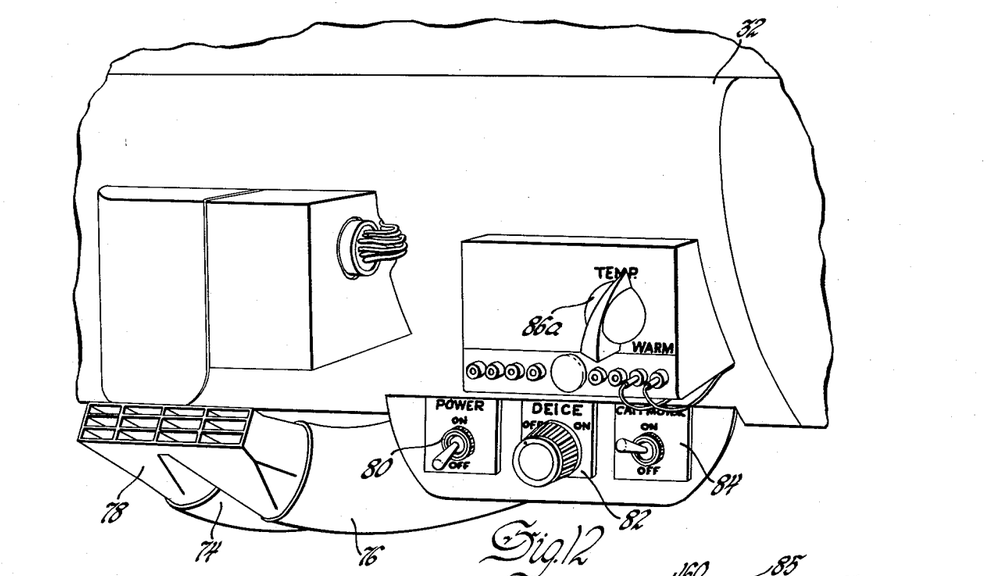
FIG. 12 is a partial view of the instrument panel on the vehicle of FIG. 1 with the system control switches and knobs in addition to nozzle ducts for discharging cooled or ventilating air into the passenger compartment.

The overall integrated system comprises the above mentioned temperature sensing means 28, 30 and 36 associated with electro-servomechanism effective by way of a cam mechanism automatically to operate various valves, dampers and switches. Air is supplied from the outside of the vehicle by way of an air inlet or duct 38 in which the sensing device 36 is located. This duct is controlled by a damper 40. Recirculation or inside air is supplied by a duct 42 leading from the passenger compartment and controlled by a damper 44. These ducts 38 and 42 join in a common duct 46 connected with the inlet to the blower 22. A blower outlet duct 48 communicates with two ducts 50 and 52, the junction being controlled by a damper 54. The duct 50 leads to the evaporator core 16 and the duct 52 is adapted to supply air to the heater core 20 as well as to a windshield defroster duct 56. The latter leads to a manifold, not shown, in turn connected to the defroster nozzles 26 and it is controlled by a damper 58 utilized for by-passing the heater core 20. The duct 56 is also connected to an air discharge duct 60 of the heater core 20 by means of a short duct 62 in which a damper 64 is installed. The discharge duct 60 connects with two conduits 66 and 68 leading to the passenger compartment and controlled by dampers 70 and 72, respectively. Ducts 74 and 76 for directing cooled or ventilation air connect the evaporator core 16 with the passenger compartment. FIG. 12 shows how these ducts may join in a vaned nozzle 78 for directing cooled air to upper zones of the passenger compartment. The heating ducts 66 and 68 direct heated air into lower and spaced zones of the compartment.

In FIG. 12 is depicted a main power switch 80, a de-ice switch 82 and a switch 84 for a cam operating motor 85. Above these switches is located a knob 86a representing a variable resistor 86 (FIG. 13) for manually selecting a comfortable temperature. If turned clockwise, it will cause the system automatically to maintain a warmer temperature whether the latter demands a cooling or heating operation. Counterclockwise turning will result in a lower temperature.

Figure 10:
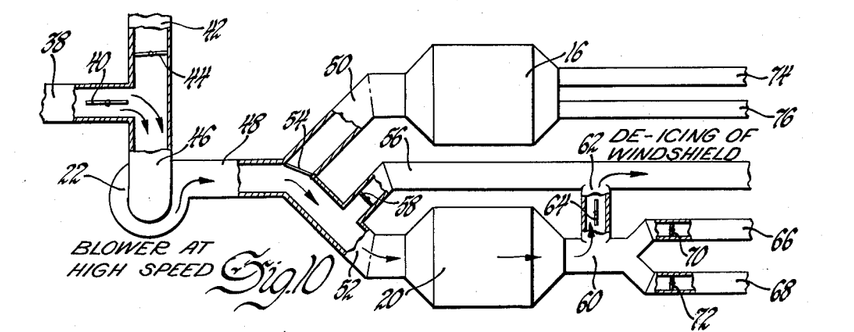
FIG. 10 is similar to FIG. 9 but provides solely for de-icing of the windshield under extreme conditions.

A number of switches are cam operated. Of such are the following: a switch 88 for controlling engagement of a clutch driving the compressor 18; a speed control switch 90 for the motor field 92a (FIG. 16) of the blower motor 92; relay operated switches 94 (FIG. 16) for controlling the motor 96 utilized in positioning the damper 54 for either cooling or heating; and a selector switch 98 for controlling the motor 100 which is adapted to rotate the dampers 70 and 72 (FIG. 10) controlling heat distribution. Switches 94a are normally closed limit switches.

Figure 17:
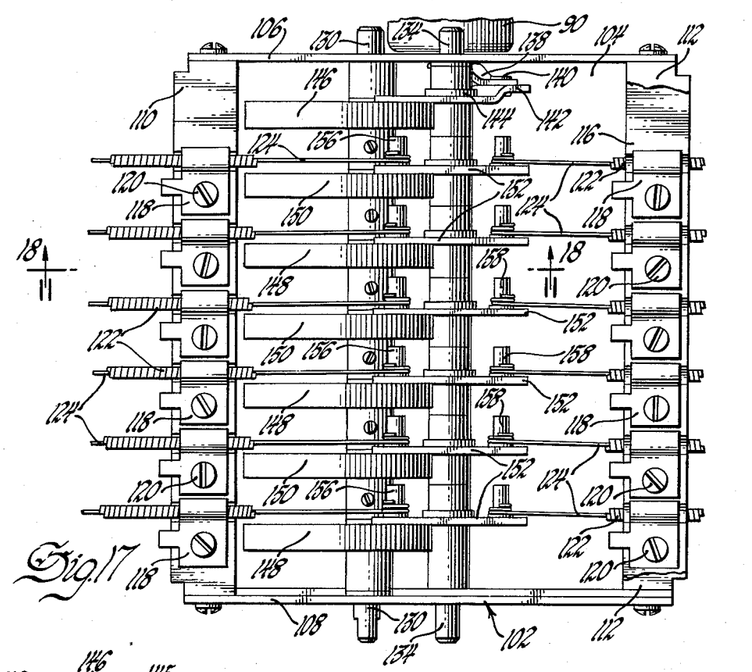
FIG. 17 is a plan view of a multiple cam control assembly with a part removed for better illustration.
Figure 18:
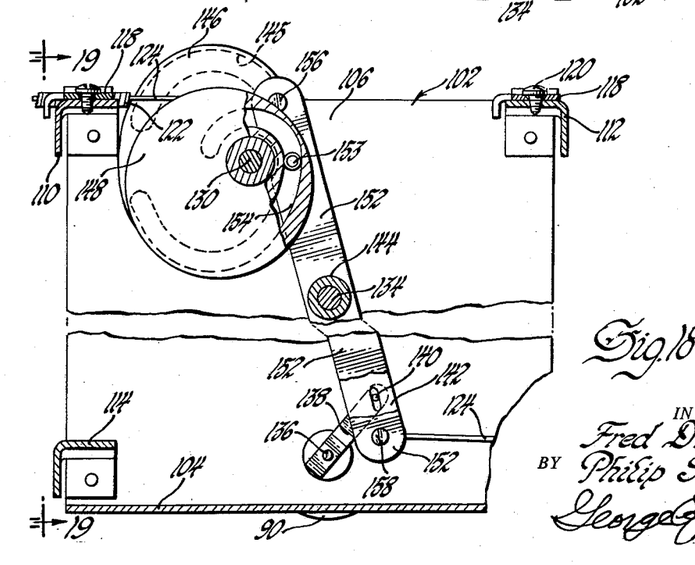
FIG. 18 is a sectional view of the assembly shown in FIG. 17 looking in the direction of the arrows 18—18 in that figure, the contours of a counterclockwise cam for air conditioning control and a blower control cam being illustrated.
Figure 19:
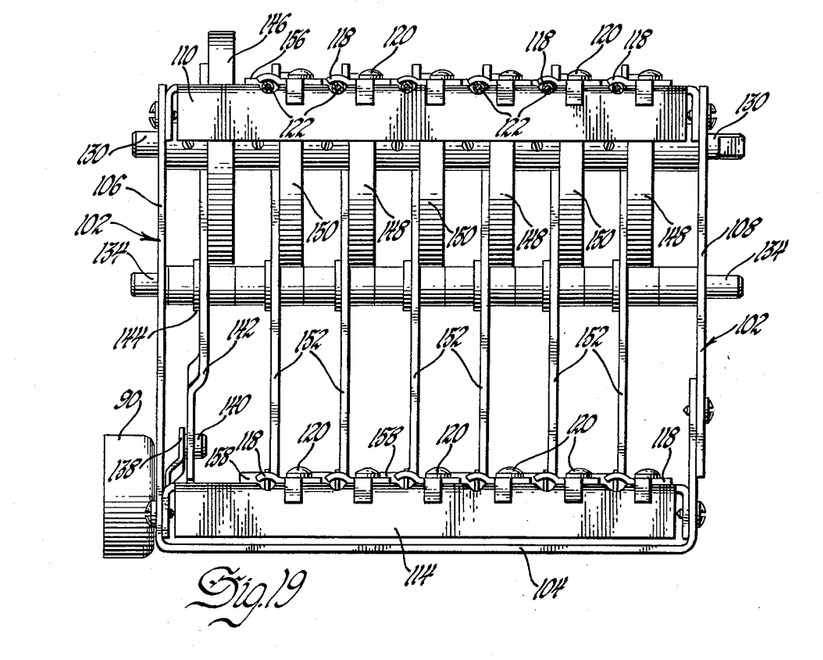
FIG. 19 is a side view of the multiple cam control assembly.

Cam means for actuating switches and valves are located in a box structure 102 shown in FIGS. 17, 18 and 19. The assembly comprises a bottom plate 104 and end plates 106 and 108 joined by four angle bars 110, 112, 114 and 116. In FIG. 17, the bar 112 is cut away in part better to illustrate six of twelve clamps 118 held by screws 120 to the bar 116 for retaining ends of conduits 122. The latter protect and guide flexible wires 124 used in operating various valves and switches. The bar 110 is provided with the six other clamps 118 and the proper conduits 122 for guiding additional wires 124. It will be appreciated that any requisite number of clamps and wires may be used and any number of cams may be used in arranging diverse alternative arrangements for which the present control system is adaptable.

Figure 13:
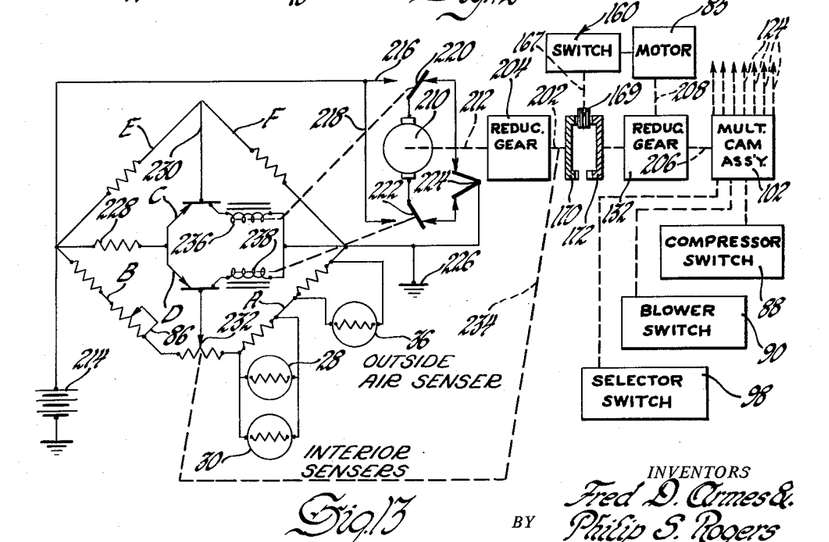
FIG. 13 is a diagrammatic view of an electronic-mechanical control arrangement forming a part of the system.
Figures 14, 15, 16:
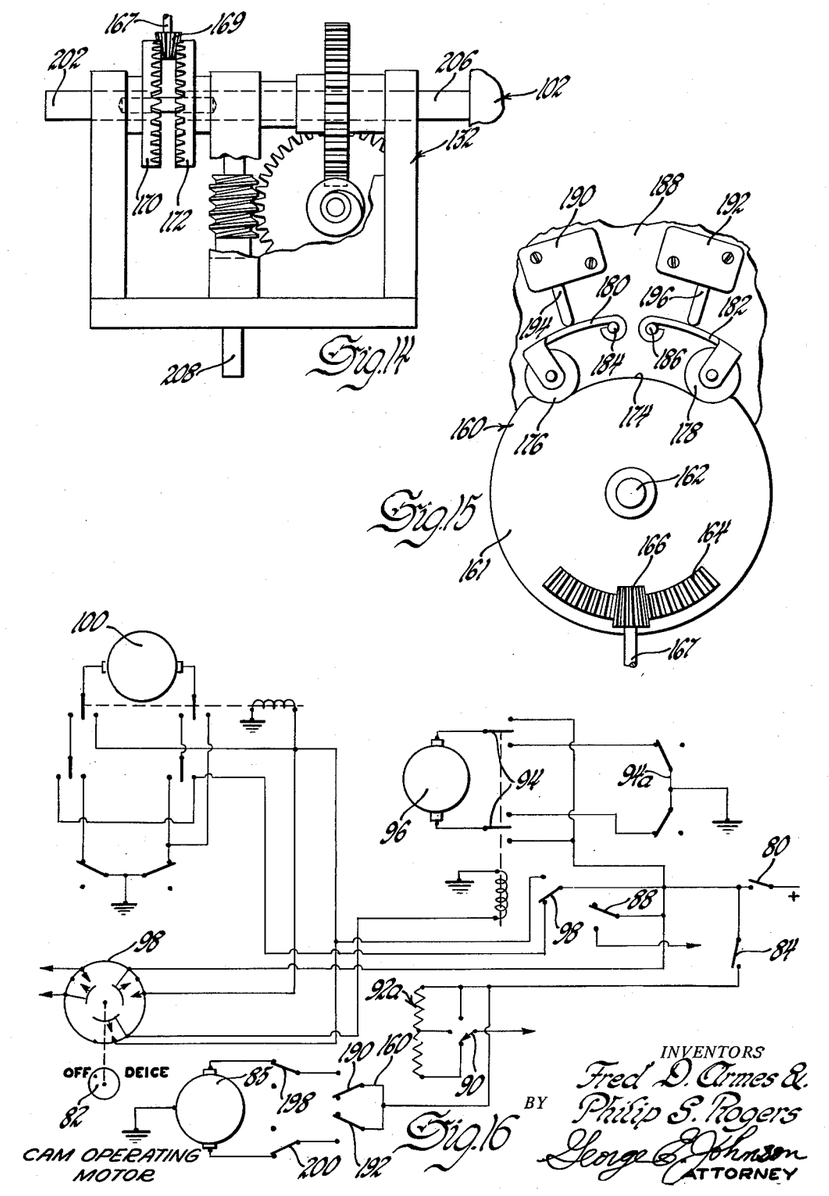
FIG. 14 is a diagrammatic view of reduction gearing represented in FIG. 13 for driving a multiple cam control assembly.
FIG. 15 is a diagrammatic view of a differential switching mechanism utilized in the arrangement of FIG. 13.
FIG. 16 is an electrical circuit diagram showing power lines and switches for operating various motors of the system.
Figure 20:
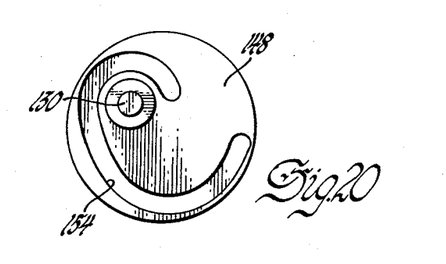
FIG. 20 shows the contour of a clockwise cam such as employed in the assembly of FIGS. 17, 18 and 19 for effecting heating control.
Figure 21:
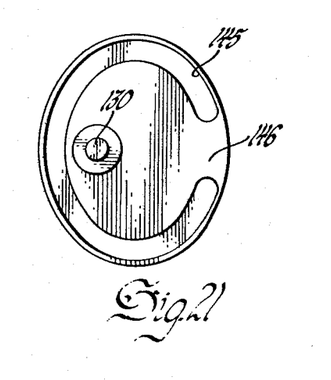
FIG. 21 shows the contour of a blower cam used at one end of the multiple cam control assembly.

A driving shaft 130 has its ends journaled in upper portions of the end plates 106 and 108. One end of the shaft is flattened to adapt it for connection to a reducing gear arrangement generally indicated at 132 (FIGS. 13 and 14). A second shaft 134 has its ends journaled in approximately the central zones of the plates 106 and 108. The switch 90 for controlling current to the blower motor field 92a is provided with its casing fixed to the lower end of the side plate 106. The operating shaft 136 of this switch extends through the end plate 106 and is fixed to a short lever 138. One end of the latter is provided with a pin 140 which serves as a pivot within a slot formed in a lever 142. The latter is provided with a hub 144 rotatable on the shaft 134. An upper end of the lever 142 is provided with a pin engaging a slot 145 in the side of a cam 146. The latter is fixed to the shaft 130 for rotation therewith. The arrangement is such that rotaiton of the shaft 130 with its cam 146 will swing the levers 142 and 138 to operate the switch 90 and thereby select a proper speed for the blower 22. There are three cams 148 depicted as operative parts for controlling the cooling aspects of the system. There are also three cams 150 utilized in controlling the heating aspects of the system. All six cams are fixed to the shaft 130 to be rotated thereby. The manner of fixing the cams to the shaft is immaterial and may be done in various ways. It is clear that the cams may be varied in shape and differ from each other in order to bring about proper timed sequence of events in automatically adjusting this system. Each cam 148 or 150 is adapted to swing the upper end of a link such as the link 152. This is done by forming a pin 153 (FIG. 18) as a part of the link to engage a cam groove such as the cam groove 154. The upper end of each link 150 is provided with a pin 156 and the lower end of the link is provided with a pin 158. Each link is journaled on the shaft 134 which supports it. One of the wires 124 is fixed to a pin 156 and another wire 124 is fixed to the pin 158. It is clear that the timing and extent of motion which must be considered with relation to each wire 124 can be determined by the provision of a suitable cam. In the instant arrangement the cam 146 for operating the blower switch 90 is of the configuration such as shown in FIG. 21. A cam 148 for use in controlling the air conditioning aspect is shown in FIGS. 18 and 20.

FIGS. 13 and 15 show a differential operated switch arrangement generally indicated at 160 for controlling the motor 85. In FIG. 15, the arrangement comprises a cam plate 161 adapted to be driven in either direction about a fixed shaft 162 by means of an arcuate rack 164 and a pinion gear 166. The latter is fixed to a shaft 167 for actuation in either direction by means of a gear 169 (FIG. 13). The gear 169 is interposed between two facing rings gears 170 and 172. The outer periphery of the cam disc 160 is provided with an arcuate recess 174 to receive two rollers 176 and 178. These rollers are supported on two pivoted links 180 and 182, respectively. These links pivot about two pins 184 and 186 fixed to a supporting portion 188 of the vehicle. Also supported on the portion 188 are two switches 190 and 192 having operating plungers 194 and 196 yieldingly contacting the links 180 and 182. FIG. 13 does not show limit switches in reference to the switch arrangement 160, but FIG. 16 shows two limit switches 198 and 200 customary in motor circuits when the extent of rotation of the motor in either direction should not exceed a predetermined amount.

The differential gearing for operating the switch arrangement 160 is not only shown in FIG. 13, but is shown in more detail in FIG. 14. The gear 170 is joined to a shaft 202 which in turn is driven by a suitable reduction gearing represented at 204 in FIG. 13. The gear 172 is joined to a shaft 206 to be rotated by the gear train, shown in FIG. 14, at a much reduced speed. Details regarding the gear train are immaterial and may be varied. The shaft 206 is connected to the shaft 130 of the multican assembly 102. The reduction gearing 132 is driven by means of the motor 85 through a shaft 208.

The reduction gearing 204 of FIG. 13 is driven by means of a motor 210 through a shaft 212. Power for driving the motor is supplied by a battery 214 and a line 216 or lines 216 and 218. Rotational direction of the motor is determined by two switches 220 and 222. The extent of rotation is determined by a limit switch 224 leading to ground at 226. The motor 210 (FIG. 13) is not shown in the circuitry of FIG. 16 in order to avoid confusion.

The bridge circuit of FIG. 13 is such that it must be balanced so the over-all resistance of leg A including the thermistors or sensors 28, 30 and 36 must have a definite total value for a given temperature. A leg B of the bridge includes the variable resistor 86 which is manually controlled by the knob 86a on the instrument panel as referred to heretofore. The emitters of two transistors C and D are arranged to receive current through a resistance 228 and from the battery 214. The bridge also includes two legs E and F, the junction of which is connected to the base of the transistor C by a line 230. The base of the transistor D is connected to the junction of the legs B and A as a follow-up potentiometer 232. The follow-up is by a gear shaft arrangement connected to the output shaft 202 of the reducing gear 204. This arrangement is illustrated by the dash line 234. Current from the collector of the transistor C is adapted to activate a relay coil 236 for operating the switch 220. Current from the collector of the transistor D is adapted to activate a relay coil 238 for operating the switch 222.

The multiple cam assembly 102 of FIG. 13 is diagrammatically illustrated with ten Bowden wires 124 operated thereby. As heretofore stated, fewer or more wires and/or cams may be used to secure numerous and different results and combinations. FIG. 13 illustrates that the compressor switch 88, the blower switch 90 and the selector switch 98 each is such that it may be directly actuated by the cam assembly 102. One wire 124 controls the hot gas by-pass valve for the air conditioning aspect as referred to in the United States patent application Serial No. 570,201. Another wire 124 controls the flow of engine coolant through the heater core 20 as mentioned with respect to the United States Patent No. 2,778,576. Others control the switches heretofore mentioned as cam operated switches. Dampers 40, 44, 58 and 64 are controlled from the cam box assembly 102.

In operating the integrated system, the two main switches 80 and 84 (FIGS. 12 and 16) may be closed with the vehicle engine ignition switch or eliminated with sole reliance on the ignition switch. With the arrangement illustrated, they are closed after the engine is started. No other manual adjustment is necessary to achieve passenger comfort except when an infrequent adjustment of the knob 86 may be desirable to suit personal whims or preferences or when an extreme condition requires de-icing of the windshield 24 in which case the switch 82 is operated. As a rule and whether it be winter or summer, no manual adjustment whatever is necessary and the temperature of the passenger compartment will be maintained in accordance with the last setting of the knob 86a or the resistance regulator 86. The automatic controls will be operated in accordance with the chart of FIG. 11 and as shown in the air flow paths illustrated in FIGS. 2 to 10 inclusive.

If it be assumed that the switches 80 and 84 are closed and the automobile is operating and more cooling is required in the passenger compartment as sensed by the two thermistors 28 and 30 or the three thermistors 28, 30 and 36, the total resistance in the leg A of the bridge will decrease and, as a result, the transistor D will cause the relay coil 238 mechanically to place the switch 222 in its position as illustrated in FIG. 13. The transistor C will simultaneously act with regard to the switch 220 and place it in closed position with regard to the line 216 from the battery 214. The motor 210 will then run in one direction and thereby cause the cam plate 161 to rotate in one direction from its position as indicated in FIG. 15 an extent limited by the limit switch (224) when it is the control switch 190 which is closed by the action of the cam plate. As a result, the motor 85 will operate in one direction to rotate the cams of the multicam assembly 102 in one direction. This will position the cams for one of the four stages of the cooling cycle depicted in the left half of the function chart of FIG. 11. When the sensers or thermistors detect that the added cooling is not necessary to retain the desired temperature setting, the transistors C and D will serve to operate the motor 210 reversing its direction (for heating) by suitably actuating the switches 220 and 222. This is because the resistance in the leg A increases as the temperature in the passenger compartment lowers. The bridge will be balanced at any specified temperature by the servo or follow-up action of the gear and shaft arrangement 234 moving the potentiometer 232 the proper corrective amount. The proper cooling effect will be imparted by the operation of the compressor 18, the evaporator 16 and the proper positioning of the dampers and switches as determined by the multi-cam arrangement 102.

If heating is required, the balancing of the bridge will be such as to rotate the motor 210 in the other direction. Switch 192 will be closed and switch 190 will be opened. The motor 85 and the cams will rotate in directions the reverse of those taken for cooling. Operation of the various dampers and switches will be as indicated in the right-hand side of the chart in FIG. 11; that is, in the heating cycle.

Figure 11:
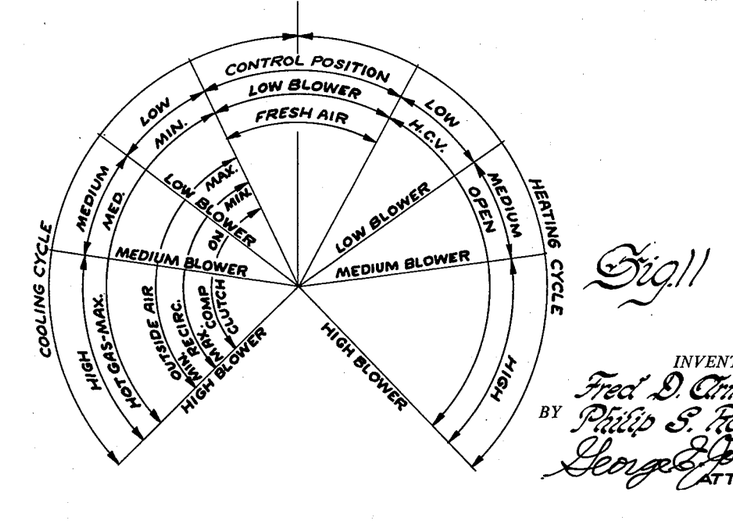
FIG. 11 is a function chart showing the stages of control realized in the use of the system involving the components, valves and ducts shown in FIGS. 2 to 10 inclusive.

Whether heating or cooling be required, the proper blower speed is determined by the cam operated switch 90. The compressor 18 is clutch actuated with the vehicle engine as the prime mover and the clutch is energized by closure of the cam-operated switch 88. In FIG. 11 the term "H.C.V. OPEN" refers to the heat control valve for admitting engine coolant to the heater core 20 of the type described in the United States Patent 2,778,576 previously referred to. It will open responsive to a capillary temperature sensitive coil as is conventional in order to maintain a discharge air temperature from the heater core as called for by its lever position. The inside and outside sensers or thermistors 30, 28 and 36 feed signals to the multi-cam assembly 102. These are compared to the rotative position of the knob 86. If there is a variation in this comparison, the bridge system is unbalanced and a correction is automatically made to achieve equilibrium by causing more or less heat to flow through the ducting into the passenger compartment.

On starting up a cold car, air is immediately blown on the windshield for defog operation while no cold air is allowed to blow on the passengers' feet. When the air temperature has been heated sufficiently by the engine coolant flowing through the heating core 20, dampers operate to allow warm air through the heating ducts. If the car is cold and extreme heating is required, the blowers automatically operate at high speed. As the car warms up the blower speed is reduced to medium speed and later to low speed if the requirement of heat is reduced to that extent. Under a condition of de-icing a windshield, the entire output of high heat and high blower speed goes to the windshield by merely switching to the "de-ice" switch 82. On switching back to automatic control the system will again balance itself and return to the setting called for as determined by the setting of the knob 86a.

At all times air is blown to the windshield. As the heat demand for the car increases, cool air to the shield decreases and warm air increases automatically. Thus, both defogging and slight de-icing conditions are automatically taken care of.

Under cooling conditions, the mixture of outside and inside air is automatically arranged. Extreme requirement call for high blower speed and recirculated air. As the demand reduces, the supply of outside air to the system increases, the blower speed is reduced to medium speed and then to low speed. As the control point between cooling and ventilating is approached, the compressor clutch is automatically disconnected and ambient air used. The ambient air use holds over into the heating cycle thus providing a smooth transition from one cycle to the other as the need arises.

We claim:

An integrated heating and air conditioning system in an automobile having a passenger compartment partly enclosed by a windshield, said system comprising heater components adapted to transfer heat from engine coolant to air, evaporator components to remove heat from air, said components including a multiple speed blower, ducts communicating with said passenger compartment and directly to said windshield for guiding air from said blower while the heat content of said air is modified by some of said components, temperature sensing thermistors in said compartment and the ambient air, a single multi-cam arrangement operatively connected to said components to effect said modification by heating and cooling and rotative through an angular range, said multiple speed blower being arranged to operate at reduced speed when said cam arrangement is in intermediate rotative positions as compared with speeds at cam arrangement positions further within said range, two reversible motors connected by a differentially operated double switch arrangement, the said double switch arrangement including two facing ring gears and a connecting pinion gear, one of said motors being connected through reduction gearing to one of said ring gears and to said cam arrangement to drive the latter in either direction dependent upon the setting of said switch arrangement, the other of said motors having an output drive arranged to rotate the other of said ring gears whereby said pinion gear is adapted to operate said switch arrangement to determine said cam arrangement rotation direction, a bridge circuit including said thermistors and a bridge balancing potentiometer and connected to said other motor for supplying power thereto, a servo arrangement connecting the other of said ring gears to said potentiometer to balance the said bridge circuit and effect rotative position of said cam arrangement in accordance with temperature conditions determined by said thermistors, and said blower and ducts being arranged to direct some air to said windshield during any rotative position of said cam arrangement.

References Cited in the file of this patent

UNITED STATES PATENTS

| | | |
|---|---|---|
| 2,264,848 | Kahl | Dec. 2, 1941 |
| 2,752,891 | Farkas | July 3, 1956 |
| 2,801,825 | Bishofberger | Aug. 6, 1957 |
| 2,807,758 | Pinckaers | Sept. 24, 1957 |
| 2,865,610 | Sparrow | Dec. 23, 1958 |
| 2,917,702 | Steghart et al. | Dec. 15, 1959 |